(12) United States Patent
Udischas et al.

(10) Patent No.: US 6,199,384 B1
(45) Date of Patent: Mar. 13, 2001

(54) SYSTEM AND METHOD FOR CONTROLLED DELIVERY OF LIQUEFIED GASES INCLUDING CONTROL ASPECTS

(75) Inventors: Richard J. Udischas, Joliet; Hwa-Chi Wang, Naperville, both of IL (US); Robert Irwin, Concord, CA (US)

(73) Assignees: American Air Liquide Inc., Countryside, IL (US); Air Liquide America Corporation, Houston, TX (US)

( * ) Notice: Subject to any disclaimer, the term of this patent is extended or adjusted under 35 U.S.C. 154(b) by 0 days.

(21) Appl. No.: 09/350,155

(22) Filed: Jul. 9, 1999

(51) Int. Cl.[7] .................................................... F17C 7/04
(52) U.S. Cl. .............................................. 62/48.1; 62/51.1
(58) Field of Search ..................................... 62/48.1, 50.2

(56) References Cited

U.S. PATENT DOCUMENTS

| | | | |
|---|---|---|---|
| 4,202,180 | * 5/1980 | Cox ....................................... | 62/48.1 |
| 5,117,639 | * 6/1992 | Take ...................................... | 62/48.1 |
| 5,546,753 | * 8/1996 | Yokogi .................................. | 62/48.1 |
| 5,591,273 | 1/1997 | Tsukamoto et al. .................... | 134/21 |
| 5,644,921 | 7/1997 | Chowdhury ............................ | 62/48.1 |
| 5,761,911 | 6/1998 | Jurcik et al. ............................. | 62/50 |

* cited by examiner

Primary Examiner—Ronald Capossela
(74) Attorney, Agent, or Firm—Burns, Doane, Swecker & Mathis, L.L.P.

(57) ABSTRACT

Provided is a novel system for delivery of a gas from a liquefied state. The system includes: (a) a cabinet having a first and second panel disposed therein; (b) at least one compressed liquefied gas cylinder corresponding to each panel disposed in the cabinet; (c) temperature and/or pressure sensors disposed on each the cylinder; and (d) a controller for monitoring and adjusting the energy input into each of the cylinders based on the temperature and/or pressure in each of the cylinders sensed by the temperature and/or pressure sensors.

12 Claims, 2 Drawing Sheets

SYSTEM AND METHOD FOR CONTROLLED DELIVERY OF LIQUEFIED GASES INCLUDING CONTROL ASPECTS

BACKGROUND OF THE INVENTION

1. Field of the Invention

The present invention relates to a system for delivery of gas from a liquefied state, and to a method for delivery of gas at a high flow rate in a controlled manner.

2. Description of the Related Art

In the semiconductor manufacturing industry, high purity gases stored in cylinders are supplied to process tools for carrying out various semiconductor fabrication processes. Examples of such processes include diffusion, chemical vapor deposition (CVD), etching, sputtering and ion implantation. The gas cylinders are typically housed within gas cabinets. These gas cabinets also contain means for safely connecting the cylinders to respective process gas lines via a manifold. The process gas lines provide a conduit for the gases to be introduced to the various process tools.

Of the numerous gases utilized in the semiconductor manufacturing processes, many are stored in cylinders in a liquefied state. A partial list of chemicals stored in this manner, and the pressures under which they are typically stored, is provided below in Table 1:

TABLE 1

| Chemical Name | Formula | Vapor Pressure of Gas at 20° C. (psia) |
|---|---|---|
| Ammonia | $NH_3$ | 129 |
| Boron Trichloride | $BCl_3$ | 19 |
| Carbon Dioxide | $CO_2$ | 845 |
| Dichlorosilane | $SiH_2Cl_2$ | 24 |
| Hydrogen Bromide | HBr | 335 |
| Hydrogen Chloride | HCl | 628 |
| Hydrogen Fluoride | HF | 16 |
| Nitrous Oxide | $N_2O$ | 760 |
| Perfluoropropane | $C_3F_8$ | 115 |
| Sulfur Hexafluoride | $SF_6$ | 335 |
| Tungsten Hexafluoride | $WF_6$ | 16 |

The primary purpose of the gas cabinet is to provide a safe vehicle for delivering gas from the cylinder to the process tool. The gas cabinet typically includes a gas panel with various flow control devices, valves, etc., in a configuration allowing cylinder changes and/or component replacement in a safe manner.

Variations in pressure of the relatively low volume cylinders stored in gas cabinets depend upon the rate of gas withdrawal from the cylinder (and the removal of the necessary heat of vaporization) as well as the transfer of ambient energy to the cylinder. Such effects are not typically present in bulk storage systems. In bulk storage systems, the thermal mass of the stored chemical is sufficiently large that liquid temperature variation occurs relatively slowly. Gas pressure in bulk systems is controlled by the temperature of the liquid. That is, the pressure inside the container is equal to the vapor pressure of the chemical at the temperature of the liquid.

In gas delivery systems based on cylinders, the need to control cylinder pressure by controlling cylinder temperature is recognized in the art. Gas cylinder heating/cooling jackets have been proposed for controlling cylinder pressure through the control of cylinder temperature. In such a case, a heating/cooling jacket can be placed in intimate contact with a cylinder. The jacket is maintained at a constant temperature by a circulating fluid, the temperature of which is controlled by an external heater/chiller unit. Such jackets are commercially available, for example, from Accurate Gas Control Systems, Inc.

Control of cylinder temperature coupled with thermal regulation of the entire gas piping system to prevent recondensation in the gas delivery system has been proposed for gases having low vapor pressures in U.S. Pat. No. 5,761,911 to Jurcik et al, hereby incorporated by reference in its entirety. The requirement for thermal regulation of the piping system is a result of the greater than ambient temperature of the cylinder caused by the heating/cooling jacket. If the gas line is not thermally controlled, recondensation of the gas flowing therethrough can occur when it passes from the heated zone into a lower temperature zone. Heating/cooling jackets coupled with thermal regulation is not favored due to the complications associated with system maintenance (e.g., during cylinder replacement) and the added expense.

To meet the requirements of the semiconductor processing industry and to overcome the disadvantages of the related art, it is an object of the present invention to provide a novel system for controlled delivery of gases from a liquefied state which allows for accurate control of the flow rate, while simultaneously providing safety features that allow shut down of the system at unacceptable temperatures for the gas employed.

It is a further object of the present invention to provide a method for delivery of gases at a variable flow rate and in a controlled manner.

It is another object of the present invention to provide a method for delivery of gases at a high flow rate over a period of time as required by the application carried out downstream.

It is yet another object of the present invention to provide a system for the delivery of a gas at consistently high purity and high flow rate, when needed and increasing the longevity of the cylinders from which the gas is withdrawn.

Other objects and aspects of the present invention will become apparent to one of ordinary skill in the art upon review of the specification, drawings and claims appended hereto.

SUMMARY OF THE INVENTION

In accordance with the inventive system it has been determined that vapor phase gas flow rate to a process from one or more cabinets may be maintained at a high level by adjusting the energy input. In particular, it is preferred that a gas cabinet having at least two panels be provided. The cylinders associated with one panel in operation delivers gas at a predetermined flow rate while energy in the form of heat is supplied to the cylinders associated with the other panel. As the pressure from the cylinders associated with the panel in operation decreases, withdrawal of vapor is switched to the other panel where the cylinders are at full pressure. Heat is subsequently supplied to the panel associated with the disengaged cylinders to bring them up to specification. Thereafter, as the pressure level of the cylinders associated with the panel in operation drops, the withdrawal operation reverts back to the panel where the cylinders are brought back to the requisite pressure. Thus, withdrawal of vapor is switched between the panels to provide the vapor at a minimum required pressure for the customer to run high flow rates rate for a longer duration of time downstream.

According to an aspect of the invention a system for delivery of a gas from a liquefied state is provided. The system includes:

(a) a cabinet having a first and second panel disposed therein;

(b) at least one compressed liquefied gas cylinder corresponding to each panel disposed in the cabinet;

(c) temperature and/or pressure sensors disposed on each the cylinder; and (d) a controller for monitoring and adjusting the energy input into each of the cylinders based on the temperature and/or pressure in each of the cylinders sensed by the temperature and/or pressure sensors.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

The invention provides for controlled delivery of gases from a liquefied state which allows for a variable and increased withdrawal of gas, while simultaneously providing safety features that allow shut down of the system at unacceptable temperatures or pressures for the gas employed.

It has been surprisingly determined that an increase in the energy input to the cylinders disposed in the cabinet results in a satisfactory adjustment of the gas flow rate from the cylinder to the point of use. In particular, the heat transfer between the ambient and the gas cylinder, reduces the temperature therebetween, and the gas withdrawn from the cylinder has a minimal amount of entrained droplets therein.

The rate of change of cylinder temperature and pressure is a balance of the rate of heat transfer to the cylinder, the energy requirements specified by the flow rate and the thermal mass of the cylinder. The rate of heat transfer between the ambient and the gas cylinder is governed by: (1) the overall heat transfer coefficient; (2) the surface area available for heat transfer; and (3) the temperature difference between the ambient and the gas cylinder. The method of calculating the rate of heat transfer is further explained in U.S. Pat. No. 5,761,911 and U.S. Pat. No. 6,076,359 which are incorporated herein by reference in their entirety.

Increasing the energy input to the cylinder in turn increases the heat transfer rate. It is, therefore, undesirable to withdraw material from the cylinder with too large of a temperature difference between the ambient and the cylinder (and by analogy, between the liquid stored and the cylinder) due to the possible entrainment of liquid droplets in the gas withdrawn from the cylinder, resulting from different boiling phenomena. As the temperature difference between the cylinder and the liquid increases, the evaporation process changes from one of interface evaporation to a bubbling type of phenomena.

The combination of three mechanisms responsible for the presence of a liquid phase in the flowing gas (i.e. impurities containing droplets entrained in the vapor withdrawn from the cylinder; formation during expansion in the first component downstream of the cylinder; and the purging of droplets existing during the startup of flow), effectively limits the flowrate of gas that can be reliably supplied by an individual gas cabinet manifold. Currently, these limitations amount to several standard liters per minute, measured on a continuous basis. It has been determined that elimination of these liquid droplets in the process gases and maintaining the temperature and/or pressure of the cylinders within a predetermined range will allow greater continuity in the flowrate provided.

Figure 1:
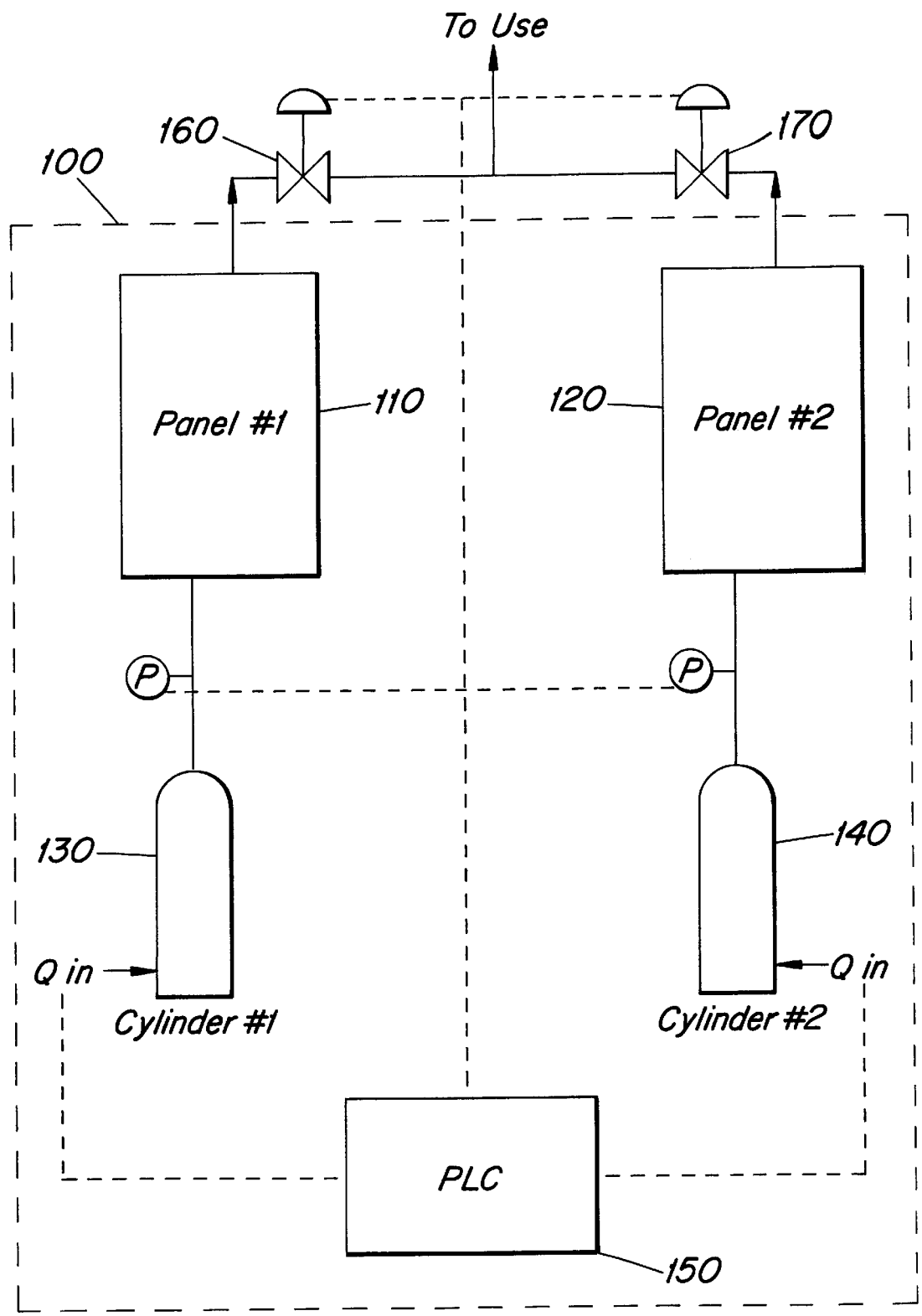
FIG. 1 is a schematic diagram of a cabinet system in accordance with the invention.

With reference to the schematic diagram of FIG. 1, a preferred embodiment of the inventive system and method for delivery of gas from a liquefied state at a variable rate and in a controlled manner is described. It is noted, however, that specific configurations will generally depend on factors such as cost, safety requirements etc.

The system comprises at least two gas panels 110 and 120 housed within a cabinet 100. Suitable panels are known in the art and are employed to control flow rates and pressure of gases (electronic specialty gases or ESG) delivered in a vapor phase. At least one compressed liquid cylinders 130 and 140 are associated with each panel. The specific material contained within the liquefied gas cylinder is not limited, but is process dependent. Typical materials include these specified in Tables 1, e.g., $NH_3$, $BCl_3$, $CO_2$, $SiH_2Cl_2$, HBr, HCl, HF, $N_2O$, $C_3F_8$, $SF_6$ and $WF_6$. However, each cylinder will contain the same ESG for any system of the invention.

These chemical products have at least a vapor and a liquid phase. Vaporized product is preferably withdrawn from or near the top of either cylinder 130 or 140, depending on which panel is in operation, and gas in a liquefied form remains at the bottom of that cylinder. Thus, the gas within the cylinders is maintained in a compressed state during operation and the vapor withdrawn therefrom has a low concentration of impurities due to the lack of entrainment of liquid droplets in the vapor delivered.

As the vapor is withdrawn the pressure in the respective cylinder decreases, thereby in effect decreasing the flow rate at which the vapor may be drawn. To restore the pressure therein and consequently increase the flow rate of vapor delivered from that cylinder it has been determined that maintaining the temperature in the cylinder within a predetermined range controls the vapor pressure within the cylinder and the flow rate at which it may be drawn and delivered.

The heat transfer rate between the ambient and gas cylinder is preferably increased such that the gas cylinder temperature is not increased to a value above the ambient temperature.

Examples of suitable means for increasing the heat transfer rate include one or more plenum plates or an array of slits in gas cabinet 100 through which air can be forced across the cylinder. An air blower or fan can be used to force the air through the plenum plates or slits. The blower can preferably operate at variable speeds. Suitable plenum plates having a maximum heat transfer coefficient for a given pressure drop (determined by the blower or fan characteristics) are commercially available from Holger Martin. Such components can easily be incorporated into a gas cabinet with minimal or no increase in gas cabinet size.

The plenum plates or slits can optionally be modified by adding fins which can direct air flow, for example, primarily towards the cylinder in the vicinity of the liquid-vapor interface.

The temperature of the plenum plates or slits can also be electrically controlled to a value slightly higher than ambient to further increase the rate of heat transfer. However, the temperature of the plenum plates or air flowing through the slits should be limited such that evaporation occurs only at the liquid-vapor interface, and to avoid heating the cylinder to a temperature above ambient.

Radiant panel heaters or a hot plate type heater disposed below the cylinder m ay also be employed to increase the heat transfer rate between the ambient and gas cylinder. Of course, combinations of the above described means for increasing the heat transfer rate are contemplated. For example, the radiant heater or a hot plate can be used in combination with a blower or fan as well as the plenum plates or slits as described above.

A control means allows for the precise control of temperature and/or pressure within the cylinder. Suitable control means are known in the art, and include, for example, one or more programable logic controller (PLC) or microprocessor 150. An acceptable temperature range having a low and a high point is programed into controller 150 depending on the liquefied gas employed.

In an exemplified embodiment, the temperature in cylinder 130 or any other cylinders associated with panel 110 is assessed by controller 150 based on a measurement of the liquid phase by a temperature sensor (not shown). In the alternative, a vapor phase pressure in cylinder 130 is determined by a transducer or any device suitable for determining pressure therein and transmitted to controller 150. A temperature reading is subsequently derived from the pressure measured in cylinder 130. The derived temperature is compared to the temperature set point range programmed in controller 150 and monitored.

Upon reaching a temperature below the set point, as desired for the particular gas employed, energy in the form of heat is transmitted to cylinder 130 until the high temperature set point is reached and indicated by an alarm, thereby terminating the energy input to that panel. A signal is transmitted from controller 150 to the heating means (not shown) to deliver energy to cylinder 130. If the derived temperature decreases below the low temperature set alarm (based on the customer's pressure requirement for withdrawing the gas) valve 160 is closed and valve 170 is opened.

Energy would continue to be supplied to cylinder 130 while cylinder 140 supplies gas trough panel 120. If the temperature set point is reached in cylinder 140, as determined by controller 150, the energy in the form of heat is transmitted to cylinder 140 associated with panel 120. Upon reaching the low temperature alarm in cylinder 140 and the alarm being sounded, gas withdrawal and delivery is switched back to panel 110 and cylinder 130 to maintain withdrawal at an acceptable flow rate. The process is continued, wherein withdrawal of gas is alternated between the panels if necessary to provide gas at a specified flow rate, while energy in the form of heat can be provided to the cylinder that is not in operation to bring it up to specification. By alternating between the panels, a high flow rate may be maintained and supplied to a processing tool for longer periods of time.

The usable dosage withdrawn from cabinet 100, is a function of the number of cylinders associated with each panel. The higher the number of cylinders associated with each panel the higher the usable dosage. As used herein, the term "dosage" is defined as (flow rate×time). Further, the cylinders connected to the panels are monitored and adjusted by controller 150. Additional modifications, such as increasing the number of panels or adjusting the temperature of each cylinder individually are contemplated by the inventors and are within the scope of the invention.

Figure 2:
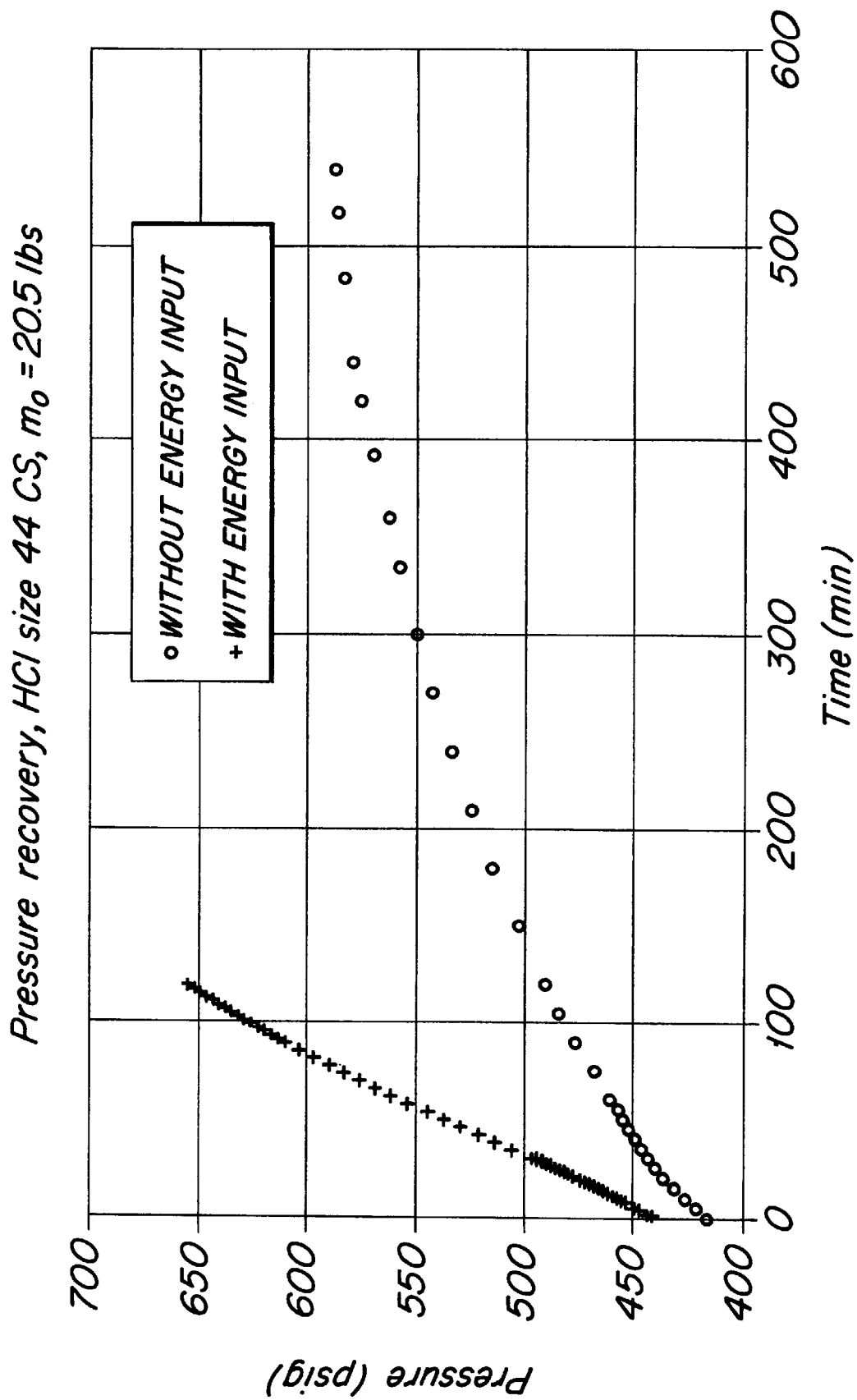
FIG. 2 is graph that depicts the pressure recovery time for a hydrochloric acid gas to return the cylinder to specification.

By way of illustration, FIG. 2 demonstrates the improved pressure recovery of the cylinders of the inventive system. In the event there is some pressure decay occurring in the cylinder and/or no demand for vapor product by the customer a heating source in addition to the ambient heat, elevates the pressure of the gaseous vapor to recover full cylinder pressure for maximum dosage capability. For instance, to deliver hydrochloric acid (HCl) effectively, the pressure necessary in one preferred system of the invention is 650 psig. In approximately 120 minutes the cylinder therein has recovered, while taking considerably longer than 500 minutes without the energy input provided by the inventive system.

Unsafe high pressures and temperatures in the cabinets are monitored and controlled by safety features incorporate into the system. A trip switch may be provided, for example, to shut off the energy source when the high temperature alarm in controller 150 is sounded and the heating means do not switch to the off mode. Other additional features known in the art may be incorporated to monitor and prevent unsafe high pressures and temperatures detected in the system.

While the invention has been described in detail with reference to a specific embodiment thereof, it will become apparent to one skilled in the art that various changes and modifications can be made, and equivalents employed without departing from the scope of the claims.

What is claimed is:

1. A system for controlled delivery of a gas from a liquefied state, the system comprising:
   (a) a cabinet having a first and a second panel disposed therein;
   (b) at least one compressed liquefied gas cylinder corresponding to each said panel disposed in said cabinet; and
   (c) sensors selected from the group consisting of temperature sensors, pressure sensors and combinations thereof disposed on each said cylinder; and
   (d) a controller for monitoring and adjusting an energy input into each of the cylinders based on a value in each of the cylinders sensed by said sensors;
   (e) means for programming a low and a high temperature set point of said compressed liquefied gas cylinder disposed on a respective said panel; and
   (f) means for switching between said first and said second panel upon reaching either a low temperature set point or a high temperature set point in said at least one compressed liquefied gas cylinder.

2. A method for delivery of gas from a liquefied state from a gas cabinet at a continuous flow in a controlled manner, the method comprising:
   (a) providing a cabinet having a first and a second panel disposed therein;
   (b) supplying a compressed liquefied gas from at least one gas cylinder associated with one of said first or second panel; and
   (c) delivering a controlled amount of energy to said at least one gas cylinder associated with one of said first or second panel and thereby increasing the flow rate of the gas withdrawn from said cylinder.

3. A method for delivery of gas at a continuous flow and in a controlled manner according to claim 2, further comprising:

(d) setting a high point and a low temperature point acceptable for said gas cylinder based on the gas employed.

4. A method for delivery of gas at a continuous flow and in a controlled manner according to claim 3, further comprising:

supplying energy to said gas cylinder associated with one of said first or second panel upon reaching a low temperature set point.

5. A method for delivery of gas at a continuous flow and in a controlled manner according to claim 4, further comprising:

alternating said supply of energy between said first and second panel, wherein said energy supplied is a function of temperature in said cylinder.

6. A method for delivery of gas at a continuous flow and in a controlled manner according to claim 5, further comprising:

supplying energy to said cylinder associated with first or second panel when said low temperature set point alarm is activated.

7. A method for delivery of gas at a continuous flow and in a controlled manner according to claim 5, further comprising:

terminating the supply of energy to said cylinder associated with first or second panel when said high temperature set point alarm is activated.

8. A method for delivery of gas at a continuous flow and in a controlled manner according to claim 2, wherein said gas temperature is derived from said cylinder pressure.

9. A method of delivery of gas at a continuous flow and in a controlled manner according to claim 2, increasing the applied dosage of said gas by a factor of X, wherein X is the number of said compressed liquefied gas cylinders.

10. A method of deliver of gas at a continuous flow and in a controlled manner according to claim 2, wherein the gas is selected from the group consisting of $NH_3$, $BCl_3$, $CO_2$, $SiH_2Cl_2$, HBr, HCl, HF, $N_2O$, $C_3F_8$, $SF_6$ and $WF_6$.

11. A method of deliver of gas at a continuous flow and in a controlled manner according to claim 2, further comprising:

reducing the recovery time of said cylinder pressure.

12. A method of delivery of gas at a continuous flow and in a controlled manner according to claim 2, wherein each said cylinder contains the same electronic specialty gas for any one system employed.

* * * * *

UNITED STATES PATENT AND TRADEMARK OFFICE
CERTIFICATE OF CORRECTION

PATENT NO.   : 6,199,384 B1
DATED        : March 13, 2001
INVENTOR(S)  : Udischas et al.

It is certified that error appears in the above-identified patent and that said Letters Patent is hereby corrected as shown below:

Column 8,
Line 8, please delete "increasing the" and replace with -- increasing an --;
Line 11, please delete "A method of deliver" and replace with
-- A method of delivery --;
Line 15, please delete "A method of deliver" and replace with -- A method of delivery --.

Signed and Sealed this

Sixth Day of November, 2001

Attest:

*Nicholas P. Godici*

NICHOLAS P. GODICI
*Attesting Officer*   *Acting Director of the United States Patent and Trademark Office*